US011537817B2

(12) United States Patent
Wang et al.

(10) Patent No.: US 11,537,817 B2
(45) Date of Patent: Dec. 27, 2022

(54) SEMI-SUPERVISED PERSON RE-IDENTIFICATION USING MULTI-VIEW CLUSTERING

(71) Applicant: DeepNorth Inc., Foster City, CA (US)

(72) Inventors: Jinjun Wang, San Jose, CA (US); Xiaomeng Xin, Xi'an (CN)

(73) Assignee: DeepNorth Inc., Redwood City, CA (US)

( * ) Notice: Subject to any disclaimer, the term of this patent is extended or adjusted under 35 U.S.C. 154(b) by 1106 days.

(21) Appl. No.: 16/164,572

(22) Filed: Oct. 18, 2018

(65) Prior Publication Data
US 2020/0125897 A1    Apr. 23, 2020

(51) Int. Cl.
| | | |
|---|---|---|
| G06K 9/62 | (2022.01) | |
| G06N 3/04 | (2006.01) | |
| G06N 3/08 | (2006.01) | |

(52) U.S. Cl.
CPC ......... *G06K 9/6259* (2013.01); *G06K 9/6218* (2013.01); *G06K 9/6262* (2013.01); *G06N 3/0454* (2013.01); *G06N 3/08* (2013.01)

(58) Field of Classification Search
CPC ..................................................... G06V 10/82
USPC ........................................................ 382/118
See application file for complete search history.

(56) References Cited

U.S. PATENT DOCUMENTS

| | | | |
|---|---|---|---|
| 2017/0132512 A1* | 5/2017 | Ioffe | .................... G06K 9/6256 |
| 2018/0276499 A1* | 9/2018 | Bak | ........................ G06V 10/56 |
| 2019/0108651 A1* | 4/2019 | Gu | ....................... G06V 10/955 |

* cited by examiner

*Primary Examiner* — Kiet M Doan
(74) *Attorney, Agent, or Firm* — David R. Stevens; Stevens Law Group

(57) ABSTRACT

A semi-supervised model incorporates deep feature learning and pseudo label estimation into a unified framework. The deep feature learning can include multiple convolutional neural networks (CNNs). The CNNs can be trained on available training datasets, tuned using a small amount of labeled training samples, and stored as the original models. Features are then extracted for unlabeled training samples by utilizing the original models. Multi-view clustering is used to cluster features to generate pseudo labels. Then the original models are tuned by using an updated training set that includes labeled training samples and unlabeled training samples with pseudo labels. Iterations of multi-view clustering and tuning using an updated training set can continue until the updated training set is stable.

10 Claims, 2 Drawing Sheets

SEMI-SUPERVISED PERSON RE-IDENTIFICATION USING MULTI-VIEW CLUSTERING

TECHNICAL FIELD

The present disclosure relates generally to a system capable of re-identifying a person amongst a set of camera views. The system can use multi-view clustering to estimate training labels used to update convolutional neural networks to perform person re-identification.

BACKGROUND

Person re-identification (RE-ID) aims at identifying the same person of interest amongst a set of camera views. Person re-identification is a challenging task due to the slight appearance distinctions and large variations in illumination, viewpoint and partial occlusion among the same identities.

Various approaches have been used to perform person re-identification. Approaches using convolutional neural networks (CNN) tend to be favored over other approaches. These CNN-based Re-ID approaches can be categorized into two classes, similarity learning and representation learning. For similarity learning approaches, the training input can be image pairs, triplets, or quadruplets. These approaches focus on learning good features in an end-to-end deep neural network system through various verification losses such as contrastive loss, triplet loss, quadruplet loss.

For representation leaning, images of different identities are fed into a deep neural network to learn a classifier through identification loss, such as, cross entropy loss. Benefiting from the powerful capacity of deep neural networks, these approaches have achieved promising results on the public benchmark datasets for person RE-ID.

Despite the impressive progress achieved by the deep learning approaches, most of these approaches are developed in a fully-supervised fashion. However, fully-supervised strategies are intrinsically limited due to the requirement of a large amount of manually labeled training data, which is very expensive and time-consuming. It can be extremely difficult to find the same person from different time, different location, and different camera captures by manually watching a set of several camera footages. As such, fully-supervised approaches are restricted when applying to a new scenario with a large number of unlabeled data.

To overcome the problem of less labeled training data, some semi-supervised or unsupervised approaches have been attempted. Some of these approaches directly use hand-crafted descriptors, while other approaches focus on finding mutually invariant information (saliency or dictionary) among cameras. However, these methods are less competitive compared with the supervised counterparts.

SUMMARY

Considering the performance of fully-supervised methods, an intuitive idea for semi-supervised learning is to estimate the labels for unlabeled samples as accurately as possible. Aspects of the invention mine the labels across cameras for unlabeled data by utilizing multiple CNN features, which can estimate labels relatively accurately.

Accordingly, semi-supervised person re-identification (Re-ID) is facilitated using a small portion of labeled data, while majority of the training samples are unlabeled. A set of heterogeneous convolutional neural networks (CNNs) are fine-tuned using labeled training samples. The labels are then propagated to the unlabeled portion for further fine-tuning the overall system. Multi-view clustering is used to label unlabeled training samples, including clustering a combination of features from the set of CNNs. During each iteration, more reliable labels are selected to update the set of CNNs, and then re-estimate the labels.

A semi-supervised learning framework for person Re-ID effectively utilizes both labeled and unlabeled training data to learn a discriminative subspace where person images across disjoint camera views can be easily matched. Multi-view clustering can be used to integrate multiple CNN model features, leading to more accurate labels estimation for unlabeled data. Each CNN model can utilize a siamese network that simultaneously computes the identification loss and verification loss. Each Siamese network simultaneously learns a discriminative CNN embedding and a similarity metric, improving pedestrian retrieval accuracy.

DETAILED DESCRIPTION

A semi-supervised model incorporates deep feature learning and pseudo label estimation into a unified framework. The deep feature learning can include multiple convolutional neural networks (CNNs), such as, for example, Caffenet, VGG16, ResNet-50. The CNNs can be trained on publicly available training datasets, such as, for example, the ImageNet. The CNNs are (fine) tuned using a small amount of labeled training samples and stored as the original models. Features are then extracted for unlabeled training samples by utilizing the original models. A multi-view clustering is used to cluster features to generate pseudo labels. Then the original models are (fine) tuned by using an updated training set that includes labeled training samples and unlabeled training samples with pseudo labels. Iterations of multi-view clustering and tuning using an updated training set can continue until the updated training set is stable.

Siamese neural network is a class of neural network architectures that contain two or more subnetworks having essentially the same configuration with the same parameters and weights. Parameter updating is mirrored across both subnetworks. Generally, two essentially identical subnetworks are used to process two inputs and another module processes the outputs of the essentially identical subnetworks to produce a final output.

Figure 1:
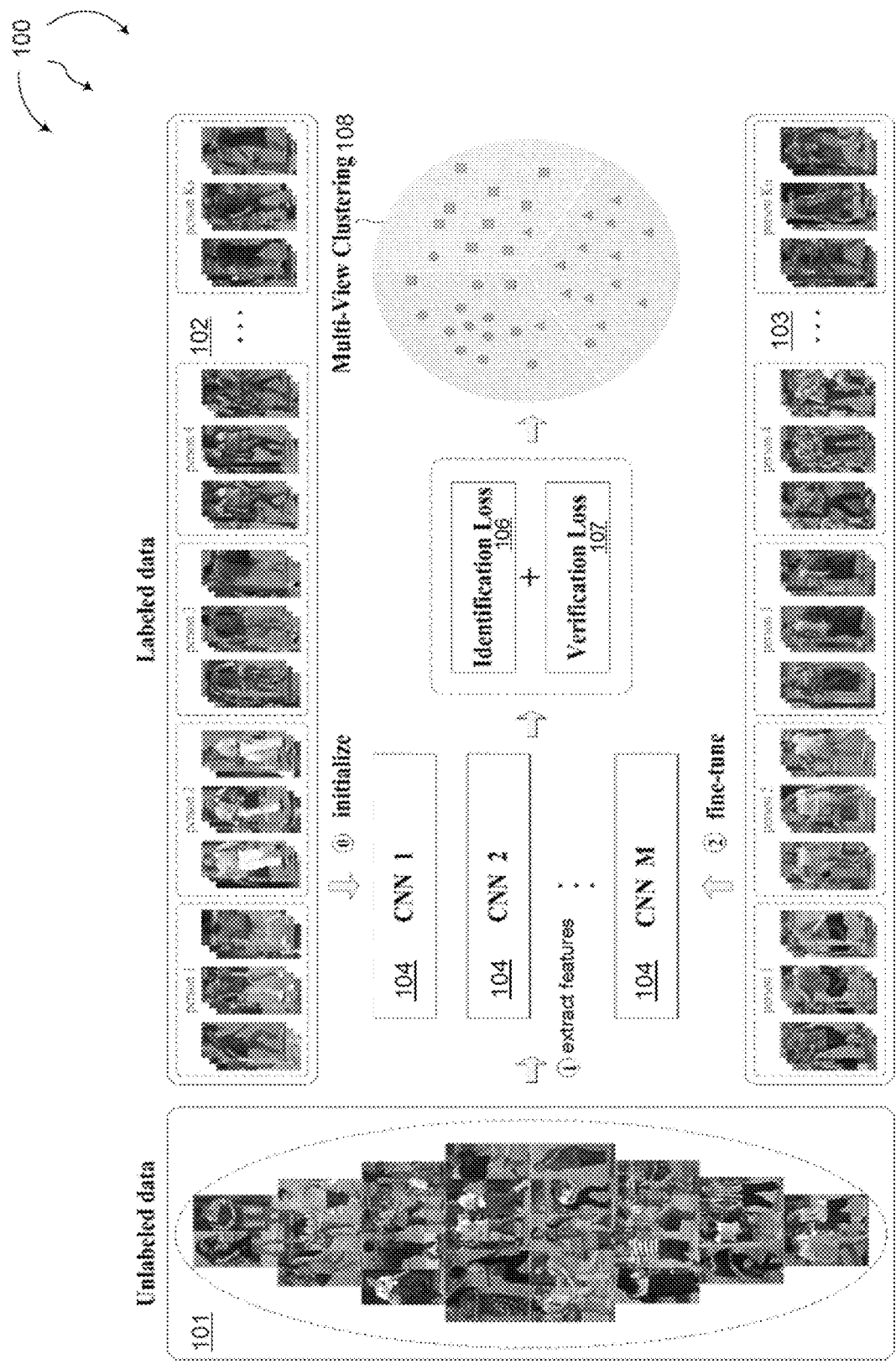
FIG. 1 illustrates an example neural network architecture for a semi-supervised learning framework
Figure 2:
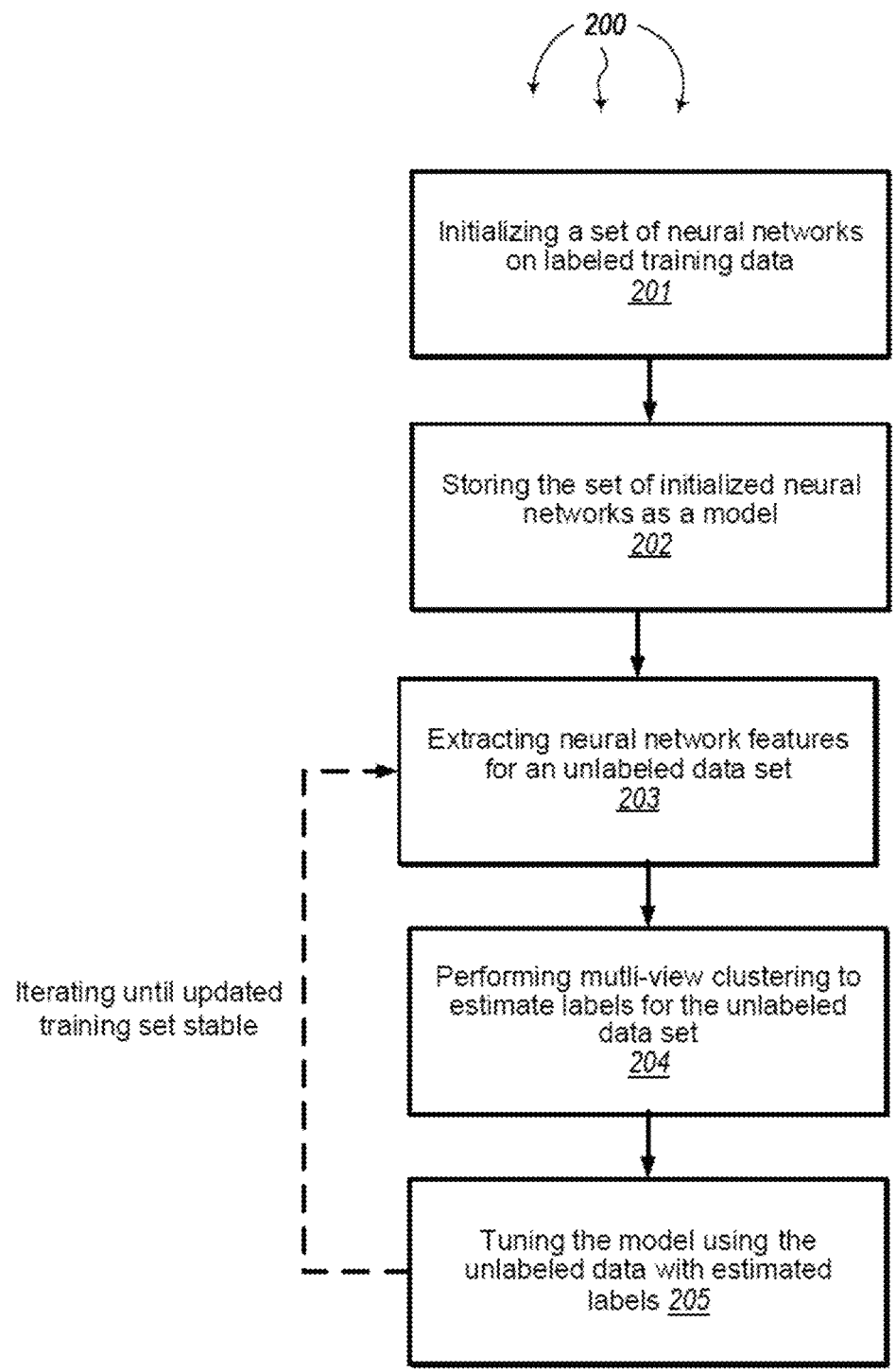
FIG. 2 illustrates a flow chart of an example method for semi-supervised learning.

FIG. 1 illustrates an example neural network architecture 100 for a semi-supervised learning framework. FIG. 2 illustrates a flow chart of an example method 200 for semi-supervised learning b. Method 200 will be described with respect to the components in neural network architecture 100

Given M types of features, $\upsilon=1, 2, \ldots, M$, an algorithm for semi-supervised learning can be formulated as depicted in equation 1:

$$\min_{w^\upsilon, y_u, F^\upsilon, G, \alpha^\upsilon} E(w^\upsilon, y_u, F^\upsilon, G, \alpha^\upsilon; \gamma) = \sum_{\upsilon=1}^{M} \sum_{l=1}^{N_l} L(y_l, \phi^\upsilon(x_l; w^\upsilon)) + \frac{1}{2}\sum_{\upsilon=1}^{M} \|w^\upsilon\|_2 + \sum_{\upsilon=1}^{M} \sum_{u=N_l+1}^{N_l+N_u} L(y_u, \phi^\upsilon(x_u; w^\upsilon)) + H(F^\upsilon, G, \alpha^\upsilon; \gamma), \quad (1)$$

where $x_l$ and $x_u$ are labeled and unlabeled training sample, respectively. $N_l$ and $N_u$ denote the number of labeled and unlabeled training samples, respectively. $w^v$ represents the parameter of CNN model under υ-th view, and $y_l$ and $y_u$ denote the label of labeled and unlabeled training samples, respectively. L(□) represents the loss function, and H(□) denotes the multi-view pseudo label estimation term.

The loss term includes identification loss 106 and verification loss 107 component according to different focuses of two tasks, the identification task and the ranking task. The loss term is computed as depicted in equation (2):

$$L=L_{iden}+L_{rank}. \quad (2)$$

Method 200 includes initializing a set of neural networks on labeled training data (201). For example, in a step 0, CNNs 104 are initialized on labeled training data 102. Method 200 includes storing the set of initialized neural networks as a model (202). For example, CNNs 104 can be stored as a model. Method 200 includes extracting neural network features for an unlabeled data set (203). For example, features can be extracted for unlabeled data 101. Method 200 includes performing multi-view clustering to estimate labels for the unlabeled data set (204). For example, multi-view clustering 108 can be performed to estimate labels for unlabeled data 101, represented by unlabeled data with estimated label after multi-view clustering 103. Method 200 includes tuning the model using the unlabeled data with estimated labels (205). For example, CNNs 104 can be tuned using unlabeled data with estimated label after multi-view clustering 103.

203-205 can be iterated until an updated training set is stable. For example, over one or more iterations features are extracted from CNNs 104 for unlabeled data 101. Multi-view clustering 108 is performed to get estimated labels. The CNN model is (fine) tuned using unlabeled data with estimated labels (103).

For basic discrimination learning, regard the identification task as a multi-class classification problem. $L_{iden}$ is formulated as depicted in equation (3):

$$L_{iden}=\Sigma-p_i \log(\hat{p}_i), \quad (3)$$

where $\hat{p}=\text{softmax}(\phi(x;w))$ is the predicted probability. $p_i$ is the target probability.

For ranking part, $L_{rank}$ is formulated as depicted in equation (4):

$$L_{rank} = \sum_{i=1}^{2} -q_i \log(\hat{q}_i), \quad (4)$$

where $\hat{q}=\text{softmax}(\phi(x_a;w)-\phi(x_b;w)^2)$ is the predicted probability. If the image pair depicts the same person, $q_1=1$, $q_2=0$; otherwise, $q_1=0$, $q_2=1$.

The multi-view pseudo label estimated term can be formulated as depicted in equation (5):

$$H(F^v, G, \alpha^v; \gamma) \sum_{v=1}^{M} (\alpha^v)^\gamma \|\Phi(X_u w^v)^T - G(F^v)^T\|_{2,1} \quad (5)$$

$$\text{s.t. } G_{ik} \in \{0, 1\}, \sum_{k=1}^{K_u} G_{ik} = 1, \sum_{v=1}^{M} a^{(v)} = 1,$$

where $X_u \in \square^{d \times N_u}$ denotes matrix whose columns are unlabeled images where d is the dimension of images features. $\Phi_{cnn}(X_u;\theta_v) \in \square^{d_v \times N_u}$ represents the CNN model feature under υ-th view. $F^v \in \square^{d_v \times K_u}$ is the centroid matrix under υ-th view, $G \in \square^{N_u \times K_u}$, which should satisfy the 1-of-$K_u$ coding scheme. $K_u$ is the expected number of clusters, $\alpha^v$ is the weight factor for the υ-th view, and γ is the parameter to control the weights distribution.

An alternative optimization strategy (AOS) can be adopted to solve the model. First, initialize w by fine-tuning multiple CNN models trained on ImageNet, which uses a small amount of labeled training samples. G is initialized by single-view k-means and the weight factor $\alpha^v=1/M$ is set for each view, with γ set as a specific value in the whole training process.

G can be updated by solving the minimization subproblem depicted in equation (6):

$$G = \min_G H(F^v, G, \alpha^v; \gamma) \text{ s.t. } G_{ik} \in \{0, 1\}, \sum_{k=1}^{K_u} G_{ik} = 1, \sum_{v=1}^{M} a^{(v)} = 1. \quad (6)$$

Then update $y_u$ to get G, with pseudo-label $k_u$ of each unlabeled training sample, and define the total number of categories of labeled training samples as $K_l$. The updating equation for $y_u$ is depicted in equation (7):

$$y_u=k_u+K_l \quad (7)$$

Finally, update $w^v$, The goal of this step is to train a CNN model by virtue of the labeled and unlabeled samples in the υ-th view. Update $w_v$ by minimizing as depicted in equation (8):

$$\min_{w^v} \sum_{l=1}^{N_l} L(y_l, \phi^v(x_l^v; w^v)) + \sum_{u=N_l+1}^{N_l+N_u} L(y_u, \phi^v(x_u^v; w^v)) + \frac{1}{2}\|w^v\|_2, \quad (9)$$

and use Stochastic Gradient Descent (SGD) to optimize $w_v$.

The optimization process can be repeated with respect to each variable under different views until the pseudo label estimation is stable.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures.

Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A computer system, comprising:
a set of person re-identification neural networks;
a processor; and
system memory coupled to the processor and storing instructions configured to cause the processor to:
initialize the set of person re-identification neural networks on labeled training data;
iteratively tune the set of person re-identification neural networks, including:
extract human facial features from an unlabeled data set;
perform multi-view clustering on the extracted human facial features estimating pseudo labels for the unlabeled data set; and
tune the set of person re-identification neural networks using the unlabeled data along with the estimated pseudo labels improving person re-identification accuracy of the set of person re-identification neural networks, after tuning:
extract other human facial features from the unlabeled data set;

perform multi-view clustering on the other extracted human facial features estimating other pseudo labels for the unlabeled data set; and further tune the set of person re-identification neural networks using the unlabeled data along with the estimated other pseudo labels further improving person re-identification accuracy of the set of person re-identification neural networks;

wherein instructions configured to perform multi-view clustering comprise instructions configured to calculate an identification loss and a ranking loss per extracted human facial feature.

2. The computer system of claim 1, wherein the set of neural networks is a set of convolutional neural networks.

3. The neural network architecture of claim 1, wherein instructions configured to initialize the set of neural networks on labeled training data comprises instructions configured to initialize the set of neural networks on ImageNet data.

4. A method comprising:
initializing a set of person re-identification neural networks on labeled training data;
iteratively tuning the set of person re-identification neural networks, including:
extracting human facial features from an unlabeled data set;
performing multi-view clustering on the extracted human facial features estimating pseudo labels for the unlabeled data set; and
tuning the set of person re-identification neural networks into a tuned set of person re-identification neural networks using the unlabeled data along with the estimated pseudo labels improving person re-identification accuracy of the set of person re-identification neural networks; after tuning:
extracting other human facial features from the unlabeled data set;
performing multi-view clustering on the other extracted human facial features estimating other pseudo labels for the unlabeled data set; and further tuning the tuned set of person re-identification neural networks using the unlabeled data along with the estimated other pseudo labels further improving person re-identification accuracy of the set of person re-identification neural networks;

wherein performing multi-view clustering comprises calculating an identification loss and a ranking loss per extracted human facial feature.

5. The method of claim 4, wherein the set of neural networks is a set of convolutional neural networks.

6. The method of claim 4, wherein initializing the set of neural networks on labeled training data comprises initializing the set of neural networks on ImageNet data.

7. The method of claim 4, wherein extracting human facial features from an unlabeled data set comprises the set of person re-identification neural networks extracting the human facial features from the unlabeled data set; and wherein extracting other human facial features from the unlabeled data set comprises the set of tuned person re-identification neural networks extracting the other human facial features from the unlabeled data set.

8. The method of claim 4, wherein estimating pseudo labels for the unlabeled data set comprises calculating a centroid matrix for the extracted human facial features and based on a weight factor and weight distribution control parameter, the centroid matrix satisfying a coding scheme and being an expected number of clusters.

9. The method of claim 4, further comprising updating the extracted human facial features with the estimated pseudo labels.

10. The method of claim 4, wherein estimating other pseudo labels for the unlabeled data set comprises re-estimating the pseudo labels; and, wherein further turning the tuned set of person re-identifier neural networks comprises further tuning the tuned set of person re-identifier neural networks using the re-estimated pseudo labels.

* * * * *